US006968371B1

(12) United States Patent
Srinivasan (10) Patent No.: US 6,968,371 B1
(45) Date of Patent: Nov. 22, 2005

(54) DESIGN FOR SCALABLE NETWORK MANAGEMENT SYSTEMS

(75) Inventor: Sanjay Srinivasan, Monroe, WA (US)

(73) Assignee: Clearwire Corporation, Kirkland, WA (US)

( * ) Notice: Subject to any disclaimer, the term of this patent is extended or adjusted under 35 U.S.C. 154(b) by 0 days.

(21) Appl. No.: 09/572,193

(22) Filed: May 17, 2000

Related U.S. Application Data
(60) Provisional application No. 60/140,593, filed on Jun. 23, 1999.

(51) Int. Cl.$^7$ ............................................. G06F 15/173
(52) U.S. Cl. ........................ 709/223; 709/224; 709/227; 709/228; 709/229
(58) Field of Search ................................ 709/223, 224, 709/227, 228, 229

(56) References Cited

U.S. PATENT DOCUMENTS

| | | | | |
|---|---|---|---|---|
| 5,261,044 A | * | 11/1993 | Dev et al. .................... | 345/855 |
| 5,423,067 A | * | 6/1995 | Manabe ....................... | 455/524 |
| 5,651,006 A | * | 7/1997 | Fujino et al. ................ | 370/408 |
| 5,655,081 A | * | 8/1997 | Bonnell et al. ............. | 709/202 |
| 5,696,486 A | * | 12/1997 | Poliquin et al. ............ | 340/506 |
| 5,768,501 A | | 6/1998 | Lewis | |
| 5,845,277 A | * | 12/1998 | Pfeil et al. ..................... | 707/3 |
| 5,864,662 A | * | 1/1999 | Brownmiller et al. ........ | 714/43 |
| 5,872,912 A | * | 2/1999 | Brownmiller et al. ........ | 714/47 |
| 5,913,036 A | * | 6/1999 | Brownmiller et al. ...... | 709/224 |
| 5,944,782 A | * | 8/1999 | Noble et al. ................ | 709/202 |
| 6,041,350 A | * | 3/2000 | Takimoto .................... | 709/223 |
| 6,072,777 A | * | 6/2000 | Bencheck et al. .......... | 370/244 |
| 6,145,001 A | * | 11/2000 | Scholl et al. ............... | 709/223 |
| 6,230,281 B1 | * | 5/2001 | Brodfuhrer et al. ............ | 714/4 |
| 6,233,610 B1 | * | 5/2001 | Hayball et al. ............. | 709/223 |
| 6,269,397 B1 | * | 7/2001 | Pirhonen .................... | 709/223 |
| 6,405,250 B1 | * | 6/2002 | Lin et al. .................... | 709/224 |
| 6,513,129 B1 | * | 1/2003 | Tentij et al. .................... | 714/4 |
| 6,564,341 B1 | * | 5/2003 | Sundaram et al. ............ | 714/43 |
| 6,708,207 B1 | * | 3/2004 | Sabelhaus et al. .......... | 709/223 |

FOREIGN PATENT DOCUMENTS

EP      0011 1965      4/2003

OTHER PUBLICATIONS

"The Future of Systems Research" by John Hennessy, IEEE, Aug. 1999, pp. 27–33.*

(Continued)

*Primary Examiner*—Ario Etienne
*Assistant Examiner*—LaShonda Jacobs
(74) *Attorney, Agent, or Firm*—Michael J. Donohue; Davis Wright Tremaine LLP (57) ABSTRACT

A system and methodology for building highly scalable Network Management Systems (NMS)s for the management of large voice and data networks is provided. The NMS of the present invention is designed to manage a plurality of network elements communicating through network controlled links. The elements are combined into management groups of no more than n elements. A first functional subsystem controls and manages the communication functions associated with a first group of elements. Each function or process inside the subsystem is guaranteed to communicate with only one instance of every other type of process or function. As additional network elements are added to the system, additional management groups are also added, one functional subsystem for every management group of elements. The plurality of other functional subsystems are substantially the same as the first functional subsystem. Limiting the management process to intra-subgroup communications greatly simplifies expansion of the system. When a total of m management groups exist, at least (m−1) functional subsystems are replicated from the first NMS subsystem. Thus, the network is scaled up by using size-limited subsystems.

23 Claims, 6 Drawing Sheets

OTHER PUBLICATIONS

"The Future of Systems Research" by John Hennessy, IEEE, Aug. 1999, pp. 27–33.*

Ram Rao Voruganti, A Global Network Mangement Framework for the '90's, IEEE Communications Magazine, Aug. 1994, pp. 74–83.

Voruganti, R. R.; "A Global Network Management Framework for the '90s"; IEEE Communications Magazine; IEEE Service Center; Piscataway, N.J. US, vol. 32, No. 8; Aug. 1, 1994; pp. 74–83; XP000471045.

"The Future of Systems Research" by John Hennessy, IEEE, Aug., 1999, pp. 27–33.

* cited by examiner

DESIGN FOR SCALABLE NETWORK MANAGEMENT SYSTEMS

RELATED APPLICATION

This application claims the benefit of U.S. Provisional Application No. 60/140,593, filed Jun. 23, 1999 and entitled "Plug & Play Design for Scalable Network Management Systems," which is incorporated herein in its entirety.

BACKGROUND OF THE INVENTION

This invention relates generally to communication network management and, more particularly, to a system and method of scaling the management functions in an expanding communications network by replicating functionally complete subsystems of a fixed maximum size. The simple replication process permits expansion of the network without changing the scope of subsystem responsibilities.

Modern communication networks can be composed of millions of functional elements, which can be hardware such as switches or multiplexers, geographically dispersed across thousands of miles of service territory. Managing such a network means providing for redundant call routing and responding to local emergencies. It is well known for a communications network to tightly monitor the individual phones, switch elements, relays, base station, and the like. Monitoring the communication network elements yields information concerning the health, maintenance, current activity, performance, and security of these elements. Such information is collected at the local levels in the network, processed, and analyzed at higher levels of management.

Additionally, the monitoring and diagnostic functions of communication network elements can be organized along specialized areas of focus, or network management tasks. For optimum performance, the information should efficiently summarize activity occurring at local levels in the network for use by administrators who manage the communications network from a regional or national perspective. It can be difficult to coordinate all the areas of narrowed focus into a comprehensive picture of network problems at the higher levels. The administrator has the difficult task of analyzing problems occurring to network elements (NE)s through whatever filtering or processing functions the network imposes between the administrator and the NEs.

The International Telecommunications UnionTelecommunications Standardization Sector (ITU-T) Telecommunications Management Network (TMN) suggests a five-layer management structure. The lowest level is the Network Element Layer (NEL), including switches and transmission distribution equipment. Above the NEL is the Element Management layer (EML) which manages the lower level elements, dealing with the issues such as capacity and congestion. The Network Management Level (NML) is concerned with managing the communication network systems associated with the NEL and EML. The Service Management Layer (SML) manages the services that are offered to the customers of the network, while the Business Management Layer (BML) on top manages the business and set goals with respect to the customer and government agencies.

Networks are typically composed of NEs from a large variety of different vendors. Therefore, there are a variety of Element Management Systems (EMS) to support communications with the NE types. The Network Management System (NMS) must interface with divergent EMS level equipment and protocols. It is the NMS systems that are responsible for controlling the communications network and keeping it functioning on a day-to-day basis. Network management can be briefly described as the task of command, control and monitoring of the network.

The ITU-T also divides management into five Operations Support Systems (OSS) areas of interest. They are: Fault Management; Configurations Management; Account Management; Performance Management; and Security Management, which are collectively referred to as FCAPS. As is well understood in the art, Fault Management is concerned with detecting network equipment problems, responding to detected problems, fixing the problems, and putting the network back into working order. Fault monitoring is usually done by receiving events from lower levels in the network indicating a fault and processing these events. This task can be very complex for large networks due to the relationships between the network elements, such as remote telephones, and the very high rate of events that must be handled. Software systems must be designed and built to handle these large data streams and provide effective fault management features.

Configuration Management is concerned with databases, backup systems, and provisioning and enablement of new network resources. That is, Configuration Management is the task of configuring the network to provide services between the various network elements. Configuring the network involves sending messages to the network elements, which set parameter values which permit signal paths to be established between elements, and controlling the behavior of these elements. The nature of modern networks makes this a complex task best handled by software.

Account Management bills the network customer for services rendered. Account Management is the task of collecting the record of services used by network elements. Usage information generates billing data that makes up the revenue stream for the service provider.

Performance Management is concerned with collecting and analyzing data that indicates how well the system is working. Performance Management involves collecting information from the network elements, which act as a measure of network performance. This "quality" measurement is critical for service providers as it defines how well they are providing service to their customers. This task is typically achieved by directly polling network elements, or otherwise receiving events from elements which convey such data.

Security Management controls and enables NE functions. Security Management is the task of managing security, including authentication and encryption, in the services provided to the end customer. Portions of each FCAPS function are performed at every layer of the TMN architecture.

The Fault Management System is one of the most critical systems in the network to control. Intelligent NEs, able to perform self-diagnosis, may provide a precise error message to the NMS. However, many NEs merely send an alarm when a problem occurs. These problems include switch failures, loss of power, line failure, and loss of RF coverage (for wireless systems). The NMS system collects the alarm data for analysis. For example, an analysis could be performed to determine a common failure mode among NEs in close physical proximity. The NMS could then issue a repair directive in response to the analysis. Intruder detection and interlock switch detection are examples of some security management issues that could be reported to the NMS by NEs.

Modern networks are both large and complex, and require the use of software for their management. A NMS describes the conglomeration of hardware and software functions required to manage and control large voice and data communication networks. NMS systems are also used for the control and provisioning of heterogeneous networks. The design of the NMS software typically follows the functional areas outlined above. Today's NMS are typically distributed systems using multiple software processes running on multiple workstations to handle the various areas of management.

Figure 1:
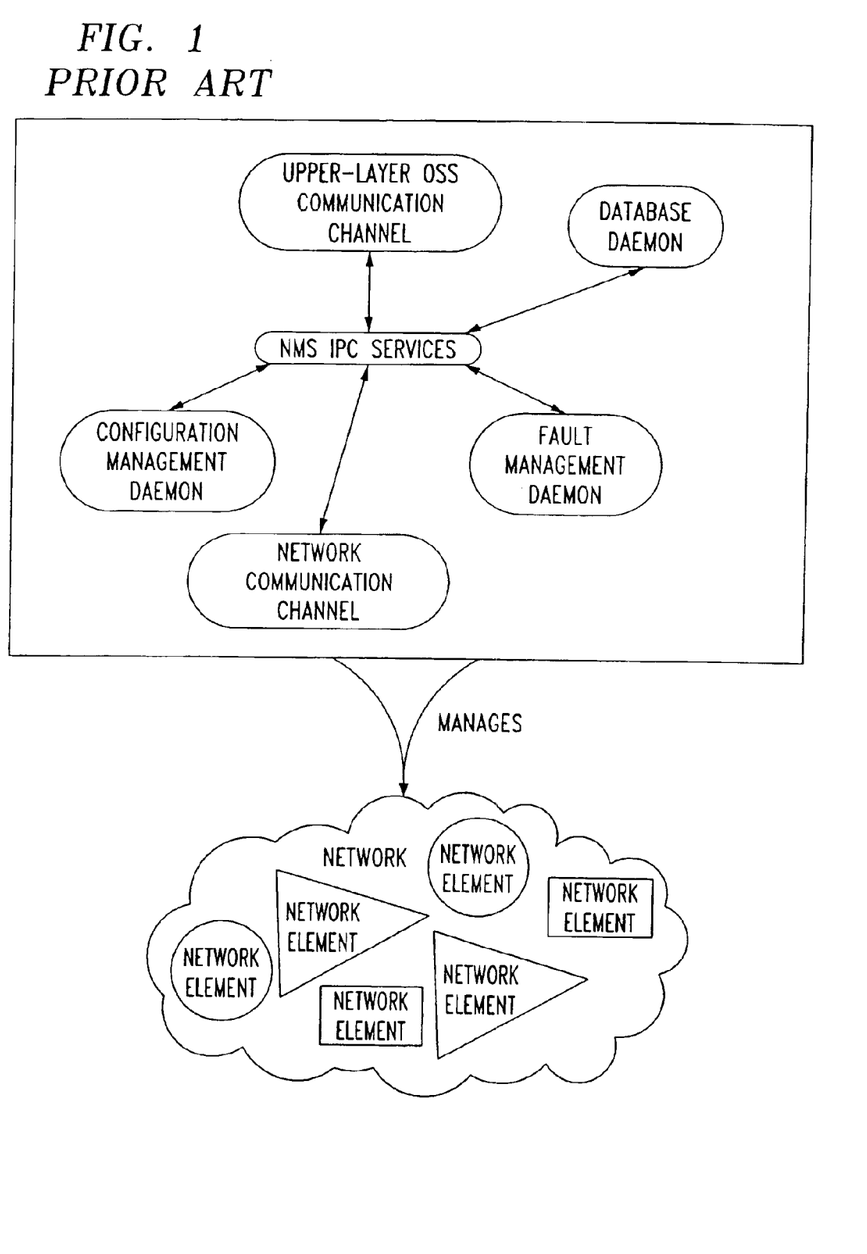
FIG. 1 shows the block diagram of a typical NMS (prior art).

FIG. 1 shows the block diagram of a typical NMS (prior art). As the figure indicates, the NMS components typically send messages to each other to accomplish the management task. They also receive events from the network over an event channel. This channel itself is a software entity like any of the other functional pieces.

The NMS is a very critical piece of the entire communications. It is the main tool for the service provider to ensure that the network is performing optimally, and that the customers are happy with the service they receive. The system must also permit rapid configuration of the network when new customers are added. All these tasks must be performed at the highest levels of performance and quality, even as the network grows in size. Service providers spend large amounts of money to come up with solutions that meet their needs. However, the task of designing and building highly scalable NMS is a very challenging one.

Designing and building a good, highly scalable, NMS is not an exact science. There are two main reasons for this. First, the traffic patterns of very large and complex network cannot be easily modeled. Second, the traffic patterns of large and complex network cannot be accurately simulated in a lab. Therefore, NMS designers must provide solutions for problems that are not well defined or easily modeled. Gross assumptions must be made on how the network will scale in size, and what effect this scale has on the network management tasks. A design strategy must be adopted based on these assumptions. When these systems are deployed in the field, many of the assumptions turn out to be erroneous, resulting in poor performance of the NMS.

As a result of a poorly performing NMS, the service provider is hurt in two ways. First, the customer experiences the dissatisfaction of interfacing with a poorly performing system. Potentially, customers can be lost if service is inadequate. Second, the service provider receives a poor return on their substantial investment in the NMS.

Apart from building the NMS on flawed assumptions, NMS designers can make design choices which exacerbate the problem. In some network designs, the cost of hardware can be cheaper than software, when the development and maintenance costs of the software are factored in. Regardless of the design philosophy, network expenditures are rarely viable if the underlying characterizations of the problems are inaccurate.

When analyzing the NMS design to meet the issue of scalability, the key issue is how well the network will perform as the number of system elements increase. Designers must make decisions on which component pieces of the system will be the least scalable. These potentially unscalable pieces are typically replicated, and multiple copies of that process are prepared.

Figure 2:
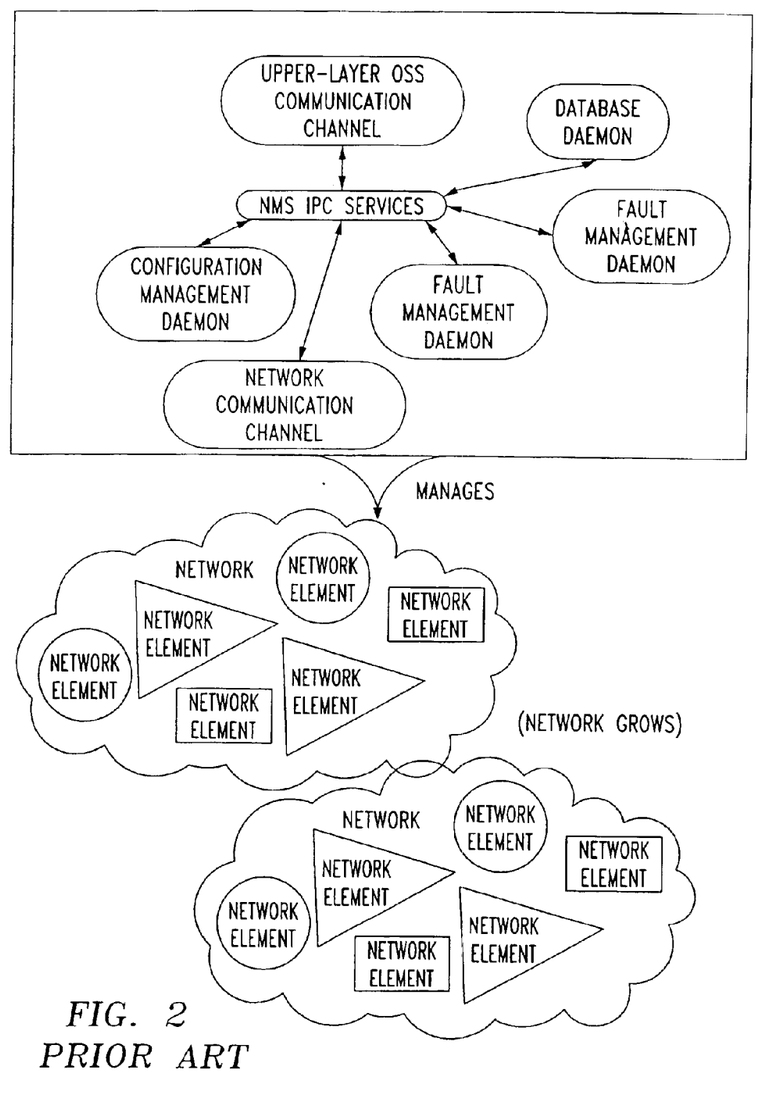
FIG. 2 illustrates an example of system function that is replicated to address the issue of scalability (prior art).

FIG. 2 illustrates an example of system function that is replicated to address the issue of scalability (prior art). For example, if the Fault Management (FM) process is considered to be the least scalable piece of the system, a decision may be made which divides the network to manage across some logical boundary and run multiple instances of the FM, with each FM being assigned to a different division of the network. However, all the other processes needed to interact with a FM must now be designed to be aware of the fact that there are multiple copies of the FM. A complicated policy of routing requests to different FM modules in the network is required. Further, framework must be put in place to inform these processes when additional instances of FM are started to handle network load. This makes the overall design of the system more complex. This complexity also makes the testing of the design more difficult and error prone.

In the above example, an assumption was made to make the FM the unit of replication, in response to the increased system size. If the assumption is wrong, then the original problem of scalability remains unaddressed, causing a very poor return on investment for NMS system expenditures.

In the example presented above, the FM may potentially be multi-threaded to increase its performance. As is well known, multi-threading permits an operating system to simultaneously execute different parts (threads) of a program. Software multi-threading is another common technique employed to increase load handling capacity. However, it is difficult to runs threads simultaneously without interference, and multi-threading is not always practical if incorrect assumptions are made in the analysis phase.

Multi-threading is a powerful technique but comes at a large cost. Designing and developing multi-threaded software is acknowledged by the industry and academia to be a very complex task. The resulting software is very hard to test completely. Further, the number of software developers that have the skill set to write multi-threaded software is very limited. Such designers are typically senior, at the high end of the pay scale. In many cases, multi-threading is not a safe option, as when the software has been developed by a third party.

It would be advantageous if a method could be developed of scaling a communications network to a larger size without having to redesign or otherwise modify the network management functions.

It would be advantageous if an NMS could be grown to a larger size using the same functional subsystems that were developed for the original NMS.

It would be advantageous if network management functions could be updated or tested in small manageable sections, so that the entire NMS did not have to be shut down or modified.

SUMMARY OF THE INVENTION

Accordingly, a scalable, minimally complex NMS, with low development and maintenance costs is provided. The NMS of the present invention is designed to manage a plurality of network elements communicating through network controlled links. The elements are organized into management groups of no more than n elements. A first NMS subsystem controls and manages the communication functions associated with a first management group. A plurality of other NMS subsystems exist in the system, one subsystem for every management group of elements. The plurality of other NMS subsystems are substantially the same as the first functional NMS subsystem. Therefore, it can be said that if a total of m management groups exist, at least (m−1) subsystems are replicated from the first NMS subsystem.

The first NMS subsystem includes fault management, configuration management, account management, performance monitoring, and security management functions, as described above. These subsystem functions communicate with each other to resolve problems and otherwise control the first management group. The other replicated subsystem functions also limit communications to interactions within their own subsystem. Therefore, as the network expands, and the subsystems are replicated, there is never a concern with communications between subsystems. Alternately stated, the number of communication partners within each subsystem is limited to only one of each type of function.

A method of scaling communication network management function in a communications NMS is also provided. The method comprising:

grouping network elements into m management groups of no more than n elements;

configuring a first NMS subsystems to manage a first management group;

limiting management of the first management group to intra-subsystem communications; and replicating (m−1) additional NMS subsystems, one for every management group.

The present invention method permits the NMS to be easily expanded. Then, the method further comprises:

adding NEs to the network;

grouping NEs into p management groups of no more than n elements, where p is greater than m; and replicating (p−m) additional NMS subsystems.

The present invention also permits the system to be easily updated, repaired, or tested. Then, the method comprises:

creating a second NMS subsystem to upgrade the management of network functions;

discontinuing the management of the first management group by the first NMS subsystem; and managing the first group of NEs with the second NMS subsystem.

DETAILED DESCRIPTION OF THE PREFERRED EMBODIMENT

The present invention is a unique design methodology for building highly scalable Network Management Systems (NMS) to manage large voice and data networks. A NMS is considered scalable if it is able to maintain its level of service as the network being managed grows in size. The level of service is typically measured with metrics like responsiveness, correctness, speed, etc. Modern networks have very large number of elements approaching hundreds of thousands, and even millions. The NMS must meet the requirement of managing the large network as it grows, while providing system operators with a view of an integrated network. The building of scalable NMS software can be mapped to developing a distributed software system comprising multiple software processes working in conjunction to exchange messages.

Figure 3:
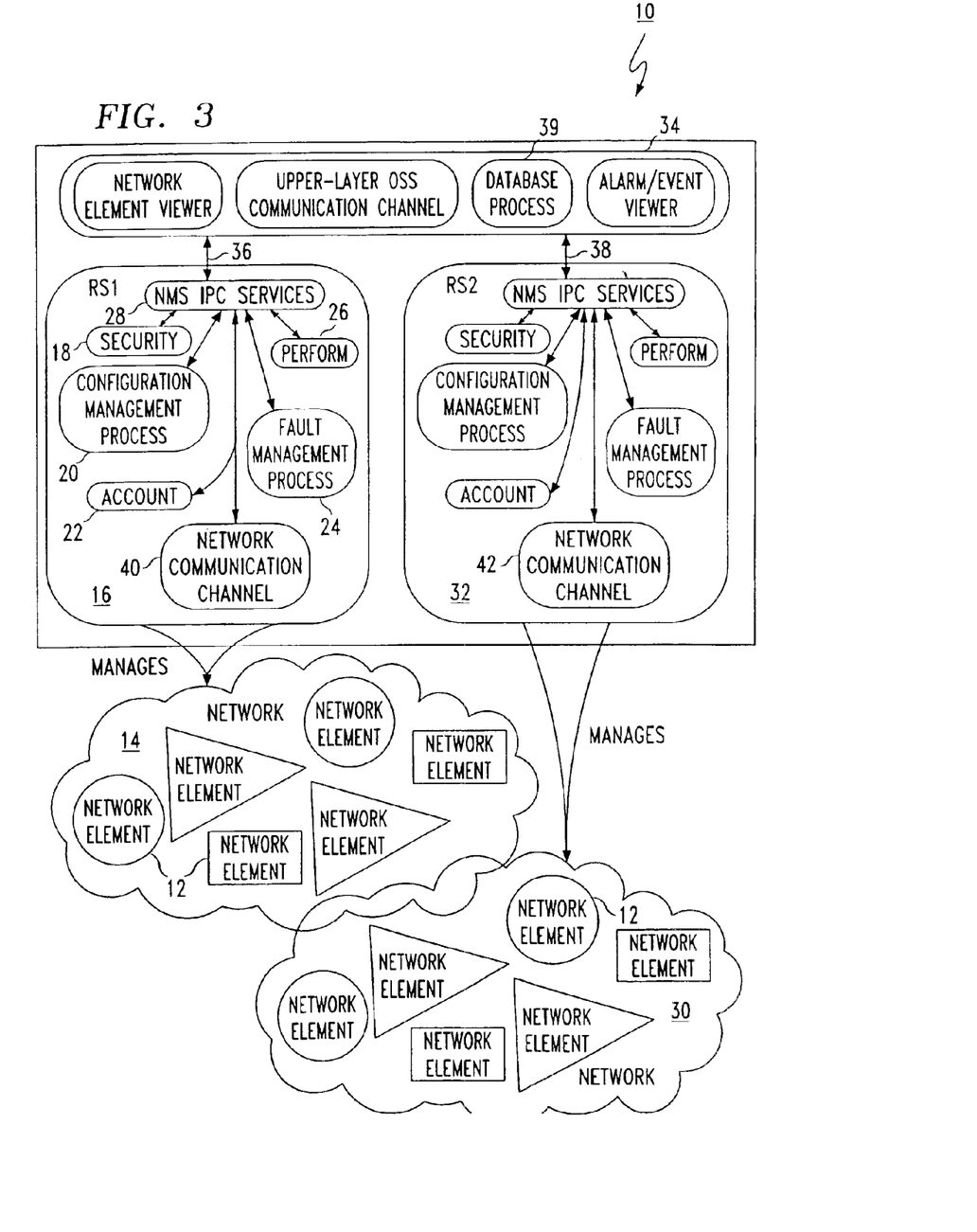
FIG. 3 illustrates the present inventive concept of system level replication to solve the problem of scalability.

FIG. 3 illustrates the present inventive concept of system level replication to solve the problem of scalability. A communications Network Management System (NMS) 10 comprises a plurality of network elements (NE)s 12. These elements can be remote telephones, landline telephones, fixed wireless stations, base stations, mobile switching centers, or the like. A first management group 14 includes no more than n network elements 12. A first NMS subsystem 16 (RS 1) includes a first plurality of management modules corresponding to a first plurality of management functions. Specifically shown are security module 18, configuration module 20, account module 22, fault management module 24, and performance module 26. The present invention is not limited to any particular number of management functions, and other functions and management modules are possible in other aspects of the invention. Further, management functions may also be combined.

Each management module 18–26 has a port connected to the other modules through NMS inter process communication (IPC) services module 28. Communications between modules 18–26 is limited to intra-subsystem communications, or communications inside the first NMS subsystem 16.

At least a second management group 30 (RS 2) is shown with no more than n network elements 12. At least a second NMS subsystem 32 is replicated from the first NMS subsystem 16. Second NMS subsystem 32 also contains a first plurality of management modules, where each management module is connected to other management modules for communications limited to the second NMS subsystem 32.

The first NMS subsystem 16 (or second NMS subsystem 32) is the portion of the system 10 under replication. The pieces within first NMS subsystem 16 are designed to manage a network of size n, where n is chosen to be a pessimistic estimate of small fraction of the final size of the network. Within this system 10, each function or process inside the first NMS subsystem 16 is guaranteed to communicate with only one instance of every other type of process or function. That is, it communicates with other functions within first NMS subsystem 16, but not with functions in the second NMS subsystem 32, even if the second NMS subsystem 32 was replicated from the first NMS subsystem 16. The management modules 18–26 need not directly communicate with functions in second NMS subsystem 32. Limiting the network to intra-subsystem management communications greatly simplifies the system design as the system is expanded.

Each NMS subsystem 16 and 32 is designed to handle n network elements 12. Thus, when the system includes fewer than n elements, a single NMS subsystem 16 is all that is required. When more than n elements are deployed, additional workstations are installed and another copy of first NMS subsystem 16 is deployed, second NMS subsystem 32 for example. Second NMS subsystem 32 operates independently of the initially installed first NMS subsystem 16.

The network operators are given an integrated view of the network through the set of top management structure graphical user interfaces (GUI)s 34 that interact with the different NMS subsystems 16 and 32 using data dependent routing 36 and 38, respectively. Each subsystem 16 and 32 is allotted a section of the network to manage. This mapping is maintained in a database 39. The GUIs 34 are operatively connected to database 39 to locate network elements 12. This information is used to route a user's request to the appropriate subsystem. Further, system 10 instructions to network elements 12 are routed through GUIs 34.

Events from the network management groups 14 and 30 make their way to the GUIs 34 through the appropriate event channels 40 and 42, respectively. GUIs 34 that display or react to network wide events are connected to all the event channels 40 and 42. The event channels 40 and 42 are easily scalable since they are treated just as the other pieces of the system. This is very important since many designers use third party software for the event channel. The properties of these third party channels are not well known and not under the designer's control.

The first NMS subsystem 16 includes a fault management module 40. The fault management module 24 monitors communications with network elements 12 in the first management group 14 for faults. The fault management module 24 communicates with other management modules 18, 20, 22, and 26 in the first NMS subsystem 16 to locate the monitored faults, and take corrective action to fix located faults.

Typically, network elements 12 have parameters that must be set before network elements 12 can communicate with each other. The first NMS subsystem 16 includes a configuration management module 20. The configuration management module 20 communicates with other management modules 18 and 20–26 of the first NMS subsystem 16 to set network element 12 parameters and to facilitate communication between selected network elements 12.

The first NMS subsystem 16 includes an account module 22. The account module 22 communicates with other management modules 18–20 and 24–26 of the first NMS subsystem 16 to generate billing data in response to the provision of services to network elements 12 in the first management group 14.

The first NMS subsystem 16 includes a performance monitoring module 26. The performance monitoring module 26 communicates with other management modules 18–24 of the first NMS subsystem 16 to provide a measurement of the quality of service being enjoyed by the network elements 12 in the first management group 14.

The first NMS subsystem 16 includes a security management module 18. The security module 18 communicates with other management modules 20–26 of the first NMS subsystem 16 to provide authorization and encryption of services to the network elements 12 in the first management group 14. Typically, the five above-named modules 18–26 are separate software applications.

Figure 4:
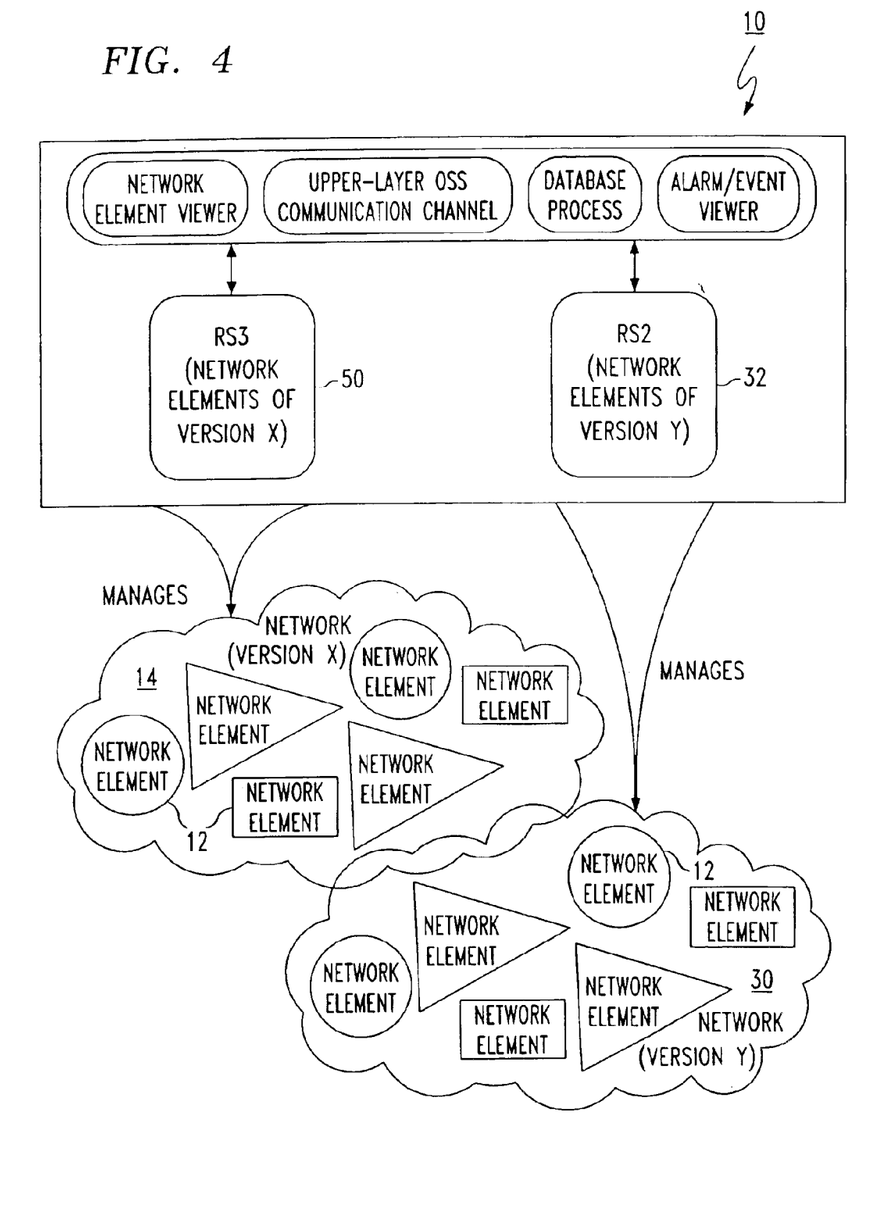
FIG. 4 illustrates the management update feature of the present invention NMS.

FIG. 4 illustrates the management update feature of the present invention NMS. While the design methodology presented above is designed for use for building a scalable system 10, it provides a neat solution for another hard problem in network management, that of network upgrading. When a network is providing service, it is very common for the network elements to be upgraded (both software and hardware) for a variety of reasons. Moreover, new network element types may also be added as more and more services are developed. When the network is upgraded, the NMS 10 must also be upgraded to handle the changes.

The network upgrade is carried out in an incremental manner where portions of the network are upgraded based on some schedule. The result of this incremental upgrade is that the NMS is required to manage different versions of the network element. New versions of the functional subsystem are designed to handle both old and new versions of the network elements. The old elements are directed to the old subsystem for management, while the upgraded network elements are directed to the new subsystem version.

System 10 comprises a third NMS subsystem 50 including a first plurality of updated management modules. The management of the first management group 14 of network elements 12 is discontinued by first functional NMS subsystem 16 (not shown, see FIG. 3). The third NMS subsystem 50 is now engaged to manage the first management group 14 of network elements 12. The system can be further updated by replicating the third NMS subsystem 50, and using the replication to replace second NMS subsystem 32.

Figure 5:
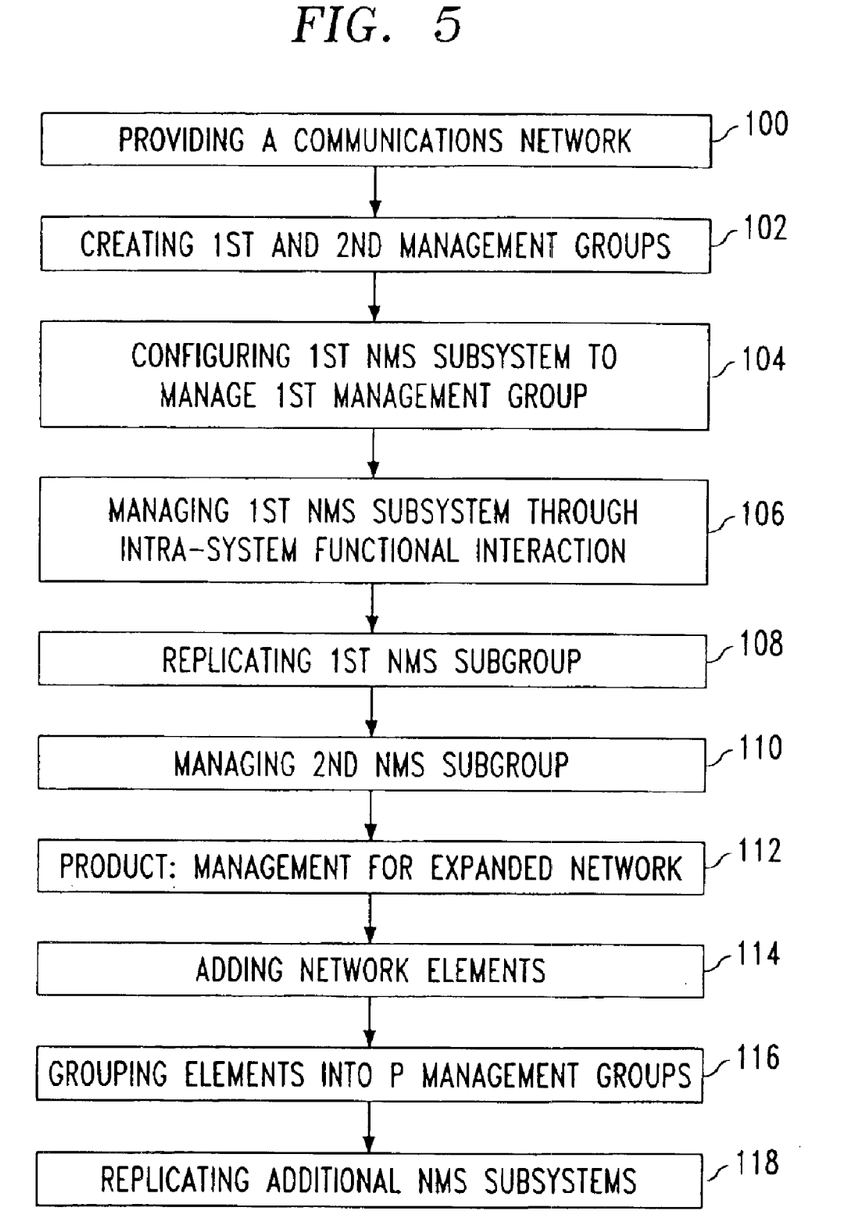
FIG. 5 is a flowchart illustrating a method for scaling a network management function.

FIG. 5 is a flowchart illustrating a method for scaling a network management function. Although the process is depicted as having numbered steps for clarity, the numbering should not be inferred to imply order in the process unless explicitly stated. Step 100 provides an expanding network of communicating network elements. Step 102 groups network elements into a first and second management group of no more than n network elements in each group. Step 104 configures a first NMS subsystem to manage a first plurality of functions for the first management group. Step 106 manages the first NMS subsystem through interactions between the first plurality of first NMS subsystem functions as described above in the explanation of FIG. 3. Step 108 replicates the first NMS subsystem, creating a second NMS subsystem to manage the first plurality of functions for the second management group. Step 110 manages the second NMS subsystem through interactions between the first plurality of second NMS subsystem functions. Step 112 is a product, where management is provided for an expanding network.

In some aspects of the invention, step 106 includes managing the first NMS subsystem by limiting interactions to the first plurality of first NMS subsystem functions. Step 110 includes managing the second NMS subsystem by limiting the interactions to the first plurality of second NMS subsystem functions.

In some aspects of the invention, further steps follow step 110. Step 114 adds network elements to the system. Step 116 groups network elements into p additional management groups of no more than n elements. Step 118 replicates p additional subsystems to manage the p additional management groups.

Typically, step 106 includes sub-steps (not shown). Step 106a includes managing the first NMS subsystem by interacting a fault management function with the other subsystem functions to monitor the network for faults, locate the monitored faults, and take corrective action to fix located faults. In some aspects of the invention, step 102 includes the elements having parameter values, and step 106b includes managing the first NMS subsystem by interacting a configuration management function with other subsystem functions to set network element parameters and to facilitate communication between elements. Step 106c includes managing the first NMS subsystem by interacting an accounting function with other subsystem functions to generate billing data in response to the provision of services to network elements. Step 106d includes managing the first NMS subsystem by interacting a performance monitoring function with other subsystem functions to measure the quality of service provided to network elements. Step 106e includes managing the first NMS subsystem by interacting a security function with other subsystem functions to provide authorization and encryption of services to network elements.

Figure 6:
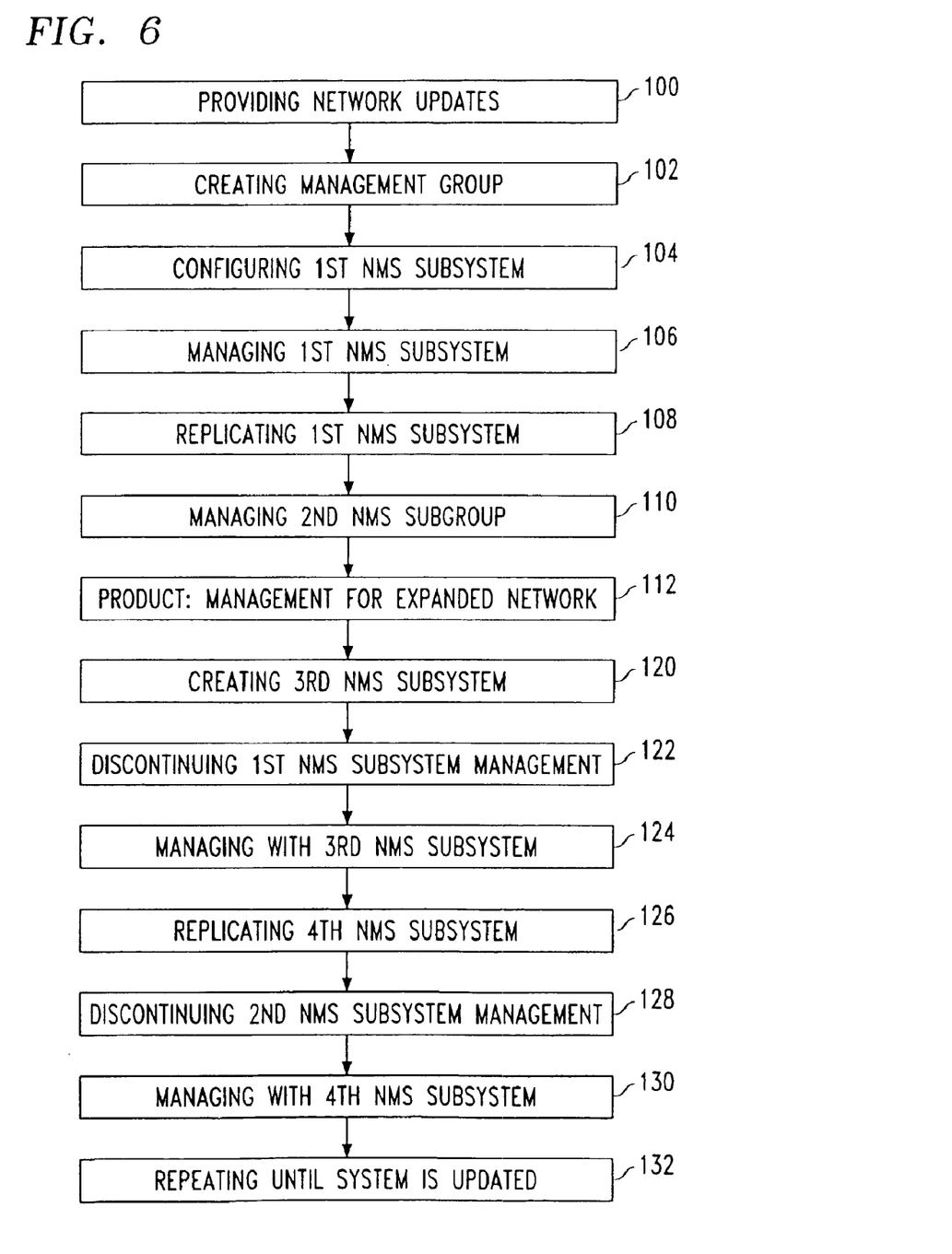
FIG. 6 illustrates the updating function of the method described in FIG. 5.

FIG. 6 illustrates the updating function of the method described by FIG. 5. Step 100 provides for the updating of the network management functions. Then, further steps follow step 112. Step 120 creates a third NMS subsystem to manage a first plurality of upgraded functions for the first management group. Step 122 discontinues the management of the first management group by the first NMS subsystem, and step 124 manages the first management group of network elements with the third NMS subsystem.

To complete the updating process, step 126 replicates a fourth NMS subsystem from the third NMS subsystem. Then, step 128 discontinues the management of the second management group by the second NMS subsystem. Step 130 manages the second management group of network elements with the fourth NMS subsystem. Step 132 iteratively repeats steps 128 and 130, replacing NMS subsystems replicated from the first NMS subsystem with NMS subsystems replicated from the third NMS subsystem until all p management groups are managed by an NMS subsystem replicated from the third NMS subsystem.

In some aspects of the invention, further steps are included. Step 134 (not shown) creates a database cross-referencing each network element to a managing group, and step 136 (not shown) locates a network element and routes system instructions to the element. In some aspects of the invention, step 136 includes creating a graphical user interface (GUI) to manipulate the location of network elements in the database.

This invention of system level replication allows the building and deployment of scalable NMS for managing a network of size N*M at the development and maintenance cost of a NMS that is designed to manage a network of size N. Further, this design allows a simple scheme for building incremental network upgrade strategies. Other variations and embodiments of the above-described invention will occur to those skilled in the art.

What is claimed is:

1. A scalable communications Network Management System (NMS) comprising:
   a plurality of network elements (NE)s;
   a first management group of no more than said NEs, where n is a pessimistic estimate of a small fraction of the final size of the network;
   a first NMS subsystem for managing said first management group, said first NMS subsystem including a first plurality of management modules corresponding to a first plurality of management functions, each said management module having a port connected to said other management modules for communications limited to said first NMS subsystem;
   a second management group of no more than said n NEs; and
   a second NMS subsystem for managing said second management group, replicated from said first NMS subsystem, with a first plurality of management modules, where each said management module is connected to said other management module for communications limited to said second NMS subsystem.

2. The system of claim 1 in which said first NMS subsystem includes a fault management module, said fault management module monitoring communications with network elements in said first management group of elements for faults, said fault management module communicating with said other management modules in said first NMS subsystem to locate the monitored faults, and taking corrective action to fix located faults.

3. The system of claim 1 in which said plurality of NEs include parameter values to be set for interfacing between selected NEs;
in which said first NMS subsystem includes a configuration management module, said configuration management module communicating with said other management modules in said first NMS subsystem to set said NE parameters, facilitating communications between selected NEs.

4. The system of claim 1 in which said first NMS subsystem includes an account module, said account module communicating with said other management modules in said first NMS subsystem to generate billing data in response to the provision of services to said NEs in said first management group.

5. The system of claim 1 in which said first NMS subsystem includes a performance monitoring module, said performance monitoring module communicating with said other management modules in said first NMS subsystem to provide a measurement of the quality of service being enjoyed by said NEs of said first management group.

6. The system of claim 1 in which said first NMS subsystem includes a security module, said security module communicating with said other management modules in said first NMS subsystem to provide authorization and encryption of services to said NEs of said first management group.

7. The system of claim 1 further comprising;
   a third NMS subsystem including a first plurality of updated management modules;
   in which the management of said first management group of said elements is discontinued by said first NMS subsystem; and
   in which said third NMS subsystem is engaged to manage said first management group of said NEs.

8. The system of claim 1 further comprising:
   at least one graphical user interface (GUI) for monitoring said NE events in said first and second NMS subsystems;
   a mapping database, operatively connected to said GUI, to locate said NEs; and
   in which system instructions to said NEs are routed through said GUI.

9. In a network of communicating network elements (NE)s, a method of scaling a network management function as the network expands, the method comprising:
   grouping NEs into first and second management groups of no more than n NEs in each group, where n is a pessimistic estimate of a small fraction of the final size of the network;
   configuring a first Network Management System (NMS) subsystem to manage a first plurality of functions for the first management group;
   managing the first NMS subsystem through interactions between the first plurality of first NMS subsystem functions;
   replicating the first NMS subsystem, creating a second NMS subsystem to manage the first plurality of functions for the second management group; and
   managing the second NMS subsystem through interactions between the first plurality of second NMS subsystem functions.

10. The method of claim 9 in which managing the first NMS subsystem includes limiting interactions to the first plurality of first NMS subsystem functions; and
   in which managing the second NMS subsystem includes limiting interactions to the first plurality of second NMS subsystem functions.

11. The method of claim 10 further comprising:

adding NEs to the system;

grouping NEs into p additional management groups of no more than said n NEs; and replicating p additional NMS subsystems from the first NMS subsystem to manage the p additional management groups.

12. The method of claim 10 in which managing the first NMS subsystem includes interacting a fault management function with the other subsystem functions to monitor the network for faults, locate the monitored faults, and take corrective action to fix located faults.

13. The method of claim 10 in which the grouping of NEs includes the NEs having parameter values which are set to interface selected NEs, and in which managing the first NMS subsystem includes interacting a configuration management function with other subsystem functions to set NE parameters, facilitating communication between selected NEs.

14. The method of claim 10 in which managing the first NMS subsystem includes interacting an accounting function with other subsystem functions to generate billing data in response to the provision of services to NEs.

15. The method of claim 10 in which managing the first NMS subsystem includes interacting a performance monitoring function with other subsystem functions to measure the quality of service provided to NEs.

16. The method of claim 10 in which managing the first NMS subsystem includes interacting a security function with other subsystem functions to provide authorization and encryption of services to NEs.

17. The method of claim 11 wherein the subsystem management functions are updated, and further comprising:

creating a third NMS subsystem to manage a first plurality of upgraded functions for the first management group;

discontinuing the management of the first management group by the first NMS subsystem; and managing the first management group of network elements with the third NMS subsystem.

18. The method of claim 17 further comprising:

replicating the third NMS subsystem to create a fourth NMS subsystem; and discontinuing the management of the second management group by the second NMS subsystem; and managing the second management group of NEs with the fourth NMS subsystem.

19. The method of claim 18 further comprising:

iteratively repeating the replacement of NMS subsystems replicated from the first NMS subsystem with subsystems replicated from the third NMS subsystem until all p management groups are managed by an NMS subsystem replicated from the third NMS subsystem.

20. The method of claim 10 further comprising:

creating a database cross-referencing each NE to a managing group; and locating a NE and routing system instructions to the NE.

21. The method of claim 20 in which the location of NEs includes creating a graphical user interface (GUI) to manipulate the location of NEs in the database.

22. In a network of communicating network elements (NE)s, a method of scaling a network management function as the network expands, the method comprising:

grouping NEs into a first network subsystem;

configuring a first Network Management System (NMS) subsystem to manage a plurality of functions for the first network subsystem;

when the number of NEs within the first network subsystem exceeds n NEs, where n is a pessimistic estimate of a small fraction of the final size of the network, creating a second network subsystem whereby the number of NEs in the first and second network subsystems each comprise no more than said n NEs;

replicating the first NMS subsystem to thereby create a second NMS subsystem-to manage the plurality of functions for the second network subsystem.

23. The method of claim 22 wherein additional network subsystems are created such that no network subsystem exceeds said n NES and additional NMS subsystems are replicated to manage the plurality of functions for each respective additional network subsystem.

* * * * *

UNITED STATES PATENT AND TRADEMARK OFFICE
CERTIFICATE OF CORRECTION

PATENT NO. : 6,968,371 B1  Page 1 of 1
DATED : November 22, 2005
INVENTOR(S) : Sanjay Srinivasan It is certified that error appears in the above-identified patent and that said Letters Patent is hereby corrected as shown below:

<u>Column 12,</u>
Line 21, following "elements," delete "(NE)s," and insert -- (NEs) --.
Line 33, following "NES;" insert -- and --.
Line 39, following "said n" delete "NES" and insert -- NEs --.

Signed and Sealed this

Twenty-eighth Day of March, 2006

JON W. DUDAS
*Director of the United States Patent and Trademark Office*